United States Patent
Kurita

(10) Patent No.: US 12,212,726 B2
(45) Date of Patent: Jan. 28, 2025

(54) IMAGE FORMING APPARATUS AND VERIFICATION METHOD FOR COMPARISON OF DATA FROM WIRELESS TAG

(71) Applicant: TOSHIBA TEC KABUSHIKI KAISHA, Tokyo (JP)

(72) Inventor: Eizo Kurita, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/338,254

(22) Filed: Jun. 20, 2023

(65) Prior Publication Data

US 2024/0040052 A1 Feb. 1, 2024

(30) Foreign Application Priority Data

Aug. 1, 2022 (JP) .................................. 2022-122637

(51) Int. Cl.
*H04N 1/32* (2006.01)
*G06K 7/10* (2006.01)
*H04N 1/00* (2006.01)

(52) U.S. Cl.
CPC ..... *H04N 1/32138* (2013.01); *G06K 7/10366* (2013.01); *H04N 1/0062* (2013.01)

(58) Field of Classification Search
CPC ............. H04N 1/32138; H04N 1/0062; H04N 1/00339; H04N 1/00342; G06K 7/10366
USPC .............................................. 358/1.11–1.18
See application file for complete search history.

(56) References Cited

U.S. PATENT DOCUMENTS

| 6,146,085 A | * | 11/2000 | Namba ................... B65H 31/30 271/294 |
| 2002/0170973 A1 | * | 11/2002 | Teraura ............... G06K 19/0723 235/492 |
| 2006/0082818 A1 | * | 4/2006 | Kasamatsu ........ H04N 1/00408 358/1.15 |
| 2006/0171753 A1 | | 8/2006 | Fessler et al. |
| 2007/0056034 A1 | * | 3/2007 | Fernstrom ............... G06F 16/93 726/20 |
| 2007/0074257 A1 | * | 3/2007 | Tamura .............. H04N 1/00244 725/104 |

(Continued)

FOREIGN PATENT DOCUMENTS

| EP | 1 760 638 A1 | 3/2007 |
| JP | 2005-225100 A | 8/2005 |

(Continued)

OTHER PUBLICATIONS

Extended European Search Report dated Jan. 2, 2024 issued in EP Application No. 23187460.3, 10 pages.

*Primary Examiner* — Chad Dickerson
(74) *Attorney, Agent, or Firm* — FOLEY & LARDNER LLP

(57) ABSTRACT

An image forming apparatus includes a conveyor configured to convey a sheet along a conveyance path, a communication interface, and a controller. The wireless tag communication device is configured to wirelessly communicate with a wireless tag of the sheet. The controller is configured to read, by the communication interface, first data from the wireless tag of the sheet on the conveyance path. The controller is configured to compare the first data with second data.

14 Claims, 3 Drawing Sheets

(56) References Cited

U.S. PATENT DOCUMENTS

| | | | | |
|---|---|---|---|---|
| 2007/0133039 A1* | 6/2007 | Yamada | ............. | H04N 1/32635 |
| | | | | 358/1.14 |
| 2007/0241903 A1* | 10/2007 | Shimazu | ............. | B65H 45/107 |
| | | | | 340/572.1 |
| 2010/0328050 A1* | 12/2010 | Kothari | ............. | G03G 15/5075 |
| | | | | 358/1.15 |
| 2018/0239289 A1* | 8/2018 | Takada | ............... | H04N 1/00612 |
| 2019/0141210 A1 | 5/2019 | Eiliott et al. | | |

FOREIGN PATENT DOCUMENTS

| | | |
|---|---|---|
| JP | 2006-088705 A | 4/2006 |
| JP | 2006-180060 A | 7/2006 |
| JP | 2006-220709 A | 8/2006 |
| JP | 2006-259549 A | 9/2006 |
| JP | 2008-307752 A | 12/2008 |

\* cited by examiner

IMAGE FORMING APPARATUS AND VERIFICATION METHOD FOR COMPARISON OF DATA FROM WIRELESS TAG

CROSS-REFERENCE TO RELATED APPLICATION

This application is based upon and claims the benefit of priority from Japanese Patent Application No. 2022-122637, filed on Aug. 1, 2022, the entire contents of which are incorporated herein by reference.

FIELD

Embodiments described herein relate generally to an image forming apparatus.

BACKGROUND

An image forming apparatus includes an image forming unit that forms an image on a sheet, and a conveyance path along which the sheet is conveyed. The image forming apparatus may include a wireless tag communication device capable of wirelessly communicating with a wireless tag of the sheet on the conveyance path. An image forming apparatus capable of checking an identity of a sheet is required.

DETAILED DESCRIPTION

In general, according to one embodiment, an image forming apparatus capable of checking an identity of a sheet is provided.

According to a first aspect of an embodiment, an image forming apparatus includes a conveyance path, a wireless tag communication device, and a control unit. On the conveyance path, a sheet is conveyed. The wireless tag communication device can wirelessly communicate with a wireless tag of the sheet. The control unit reads, by the wireless tag communication device, first data from the wireless tag of the sheet on the conveyance path. The control unit compares the first data with acquired second data in advance.

According to a second aspect of the embodiment, in the image forming apparatus according to the first aspect, the image forming apparatus further includes an image forming unit. The image forming unit is located on the conveyance path and forms an image on the sheet. The control unit writes, by the wireless tag communication device, the second data onto a plurality of sheets continuously conveyed on the conveyance path, and forms the images by the image forming unit. Thereafter, the control unit reads again the first data from the plurality of sheets continuously conveyed on the conveyance path.

According to a third aspect of the embodiment, in the image forming apparatus according to the second aspect, after the plurality of sheets are discharged on which the second data is written and the images are formed, the control unit reads again the first data from the plurality of sheets continuously conveyed on the conveyance path.

According to a fourth aspect of the embodiment, in the image forming apparatus according to the second or third aspect, the image forming apparatus further includes a second data generation unit configured to generate the second data. The control unit writes the second data generated by the second data generation unit onto the plurality of sheets.

According to a fifth aspect of the embodiment, in the image forming apparatus according to the second or third aspect, the control unit writes the second data acquired from the outside onto the plurality of sheets.

Figure 1:
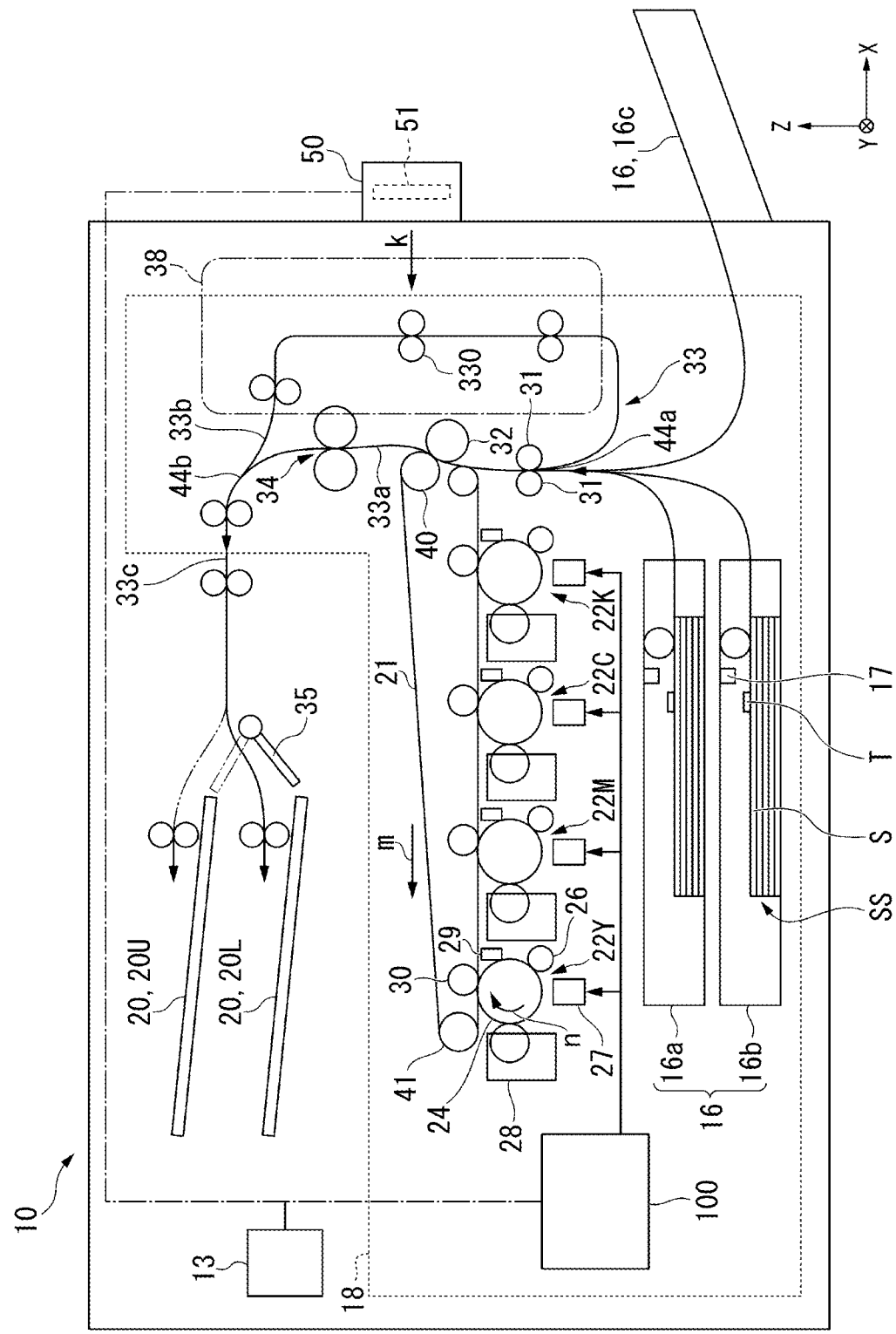
FIG. 1 is an explanatory diagram showing an example of a configuration of an image forming apparatus.

Hereinafter, an image forming apparatus and a wireless tag communication device according to an embodiment will be described with reference to the drawings. First, a configuration of an image forming apparatus 10 according to the embodiment will be described with reference to FIG. 1. FIG. 1 is an explanatory diagram showing an example of the configuration of the image forming apparatus 10. For example, the image forming apparatus 10 is disposed in a workplace.

In FIG. 1, the image forming apparatus 10 includes a control panel 13, a wireless tag communication device 50, and a printer unit 18. The printer unit 18 includes a control unit 100, sheet feeding cassettes 16a and 16b, and the like. The control unit 100 controls the control panel 13, the wireless tag communication device 50, and the printer unit 18. The control unit 100 controls sheet conveyance in the printer unit 18. The control of sheet conveyance means controlling a sheet conveyance timing, a sheet stop position, a sheet conveyance speed, and the like.

The control panel 13 (e.g., a user interface or operator interface) includes input keys and a display unit (e.g., a display). For example, the input keys receive an input from a user. For example, the display unit is of a touch panel type. The display unit receives an input from a user, and displays the input to the user. For example, the control panel 13 displays items related to an operation of the image forming apparatus 10 on the display unit in a settable manner. The control panel 13 notifies the control unit 100 of the items set by the user.

The sheet feeding cassettes 16a and 16b store sheets S having wireless tags T. The sheet feeding cassettes 16a and 16b can also store the sheets S having no wireless tags T. In the following description, the sheet S is the sheet S having the wireless tag T unless otherwise specified. For example, a material such as paper or a plastic film is used for the sheet S.

The printer unit 18 performs an operation of forming an image. For example, the printer unit 18 forms, on a sheet, an image indicated by image data. In the following description, forming an image on a sheet is also referred to as "printing". The printer unit 18 is a device that fixes a toner image in the present embodiment, but is not limited to thereto, and may be an inkjet device.

The printer unit 18 includes an intermediate transfer belt 21. The printer unit 18 supports the intermediate transfer belt 21 by a driven roller 41, a backup roller 40, and the like. The printer unit 18 rotates the intermediate transfer belt 21 in a direction of an arrow m. The printer unit 18 includes four sets of image forming stations 22Y 22M, 22C and 22K. The image forming stations 22Y, 22M, 22C and 22K correspond to yellow (Y), magenta (M), cyan (C), and black (K), respectively. The image forming stations 22Y, 22M, 22C and 22K are disposed below the intermediate transfer belt 21 along a rotation direction of the intermediate transfer belt 21.

Hereinafter, among the image forming stations 22Y, 22M, 22C and 22K, the image forming station 22Y for yellow (Y) will be described as an example. Since the image forming stations 22M, 22C and 22K have the same configuration as the image forming station 22Y, the detailed description thereof will be omitted.

The image forming station 22Y includes a charging charger 26, an exposure scanning head 27, a developing device 28 (e.g., a developer), and a photoreceptor cleaner 29. The charging charger 26, the exposure scanning head 27, the developing device 28, and the photoreceptor cleaner 29 are disposed around a photoreceptor drum 24 that rotates in a direction of an arrow n.

The image forming station 22Y includes a primary transfer roller 30. The primary transfer roller 30 faces the photoreceptor drum 24 with the intermediate transfer belt 21 interposed therebetween.

The charging charger 26 uniformly charges the photoreceptor drum 24. The exposure scanning head 27 exposes the uniformly charged photoreceptor drum 24 to form an electrostatic latent image on the photoreceptor drum 24. The developing device 28 develops the electrostatic latent image on the photoreceptor drum 24 using two-component developer formed of a toner and a carrier.

The primary transfer roller 30 primarily transfers a toner image formed on the photoreceptor drum 24 onto the intermediate transfer belt 21. The primary transfer rollers 30 of the image forming stations 22Y, 22M, 22C and 22K primarily transfer toner images onto the intermediate transfer belt 21, thereby forming a color toner image on the intermediate transfer belt 21. The color toner image is a toner image formed by sequentially superimposing the toner images of yellow (Y), magenta (M), cyan (C), and black (K). The photoreceptor cleaner 29 removes the toner remaining on the photoreceptor drum 24 after the primary transfer.

The printer unit 18 includes a secondary transfer roller 32. The secondary transfer roller 32 faces the backup roller 40 with the intermediate transfer belt 21 interposed therebetween. The secondary transfer roller 32 secondarily transfers the color toner image on the intermediate transfer belt 21 collectively onto the sheet. The secondary transfer roller 32 functions as an image forming unit that forms the image on the sheet. In the following description, a "toner image" may refer to either a color toner image or a toner image of only one color. The toner image may be a toner image using a decolorable toner.

The conveyance path 33 is a path along which the sheet is conveyed by a plurality of conveyance rollers (for example, a conveyor such as the conveyance rollers 330). The conveyance path 33 includes a first conveyance path 33a (e.g., a first portion of the conveyance path 33), a second conveyance path 33b (e.g., a second portion of the conveyance path 33), and a third conveyance path 33c (e.g., a third portion of the conveyance path 33). The first conveyance path 33a is a conveyance path from a merging portion 44a to a branching portion 44b. The second conveyance path 33b is a conveyance path that passes through a duplex printing device 38 and that is from the branching portion 44b to the merging portion 44a but different from the first conveyance path 33a. The third conveyance path 33c is a conveyance path from the branching portion 44b to a sheet discharge tray 20.

The sheet S is taken out from any one of the sheet feeding cassette 16a, the sheet feeding cassette 16b, and a manual feeding tray 16c, each of which serves as a sheet placement portion 16. A sheet set SS including a plurality of sheets S is disposed in the sheet placement portion 16. Registration rollers 31 are disposed upstream of the secondary transfer roller 32 in a conveyance direction of the sheet S on the first conveyance path 33a. The sheet S taken out from the sheet placement portion 16 is temporarily stopped at a portion where the two stopped registration rollers 31 are in contact with each other. At this time, a leading end of the sheet S abuts against the registration rollers 31, and an inclination of the sheet S is corrected. The control unit 100 causes the registration rollers 31 to start rotating in alignment with a position of the toner image on the rotating intermediate transfer belt 21 to move the sheet S to a position of the secondary transfer roller 32.

The toner image formed on the intermediate transfer belt 21 is secondarily transferred onto the sheet by the secondary transfer roller 32. The secondarily transferred toner image is fixed on the sheet by a fixing device 34. In this manner, the image is formed on the sheet under the control of the control unit 100. The control unit 100 conveys the sheet on which the toner image is fixed by the fixing device 34 to the third conveyance path 33c and discharges the sheet to the sheet discharge tray 20.

The sheet discharge tray 20 includes an upper tray 20U and a lower tray 20L. A distribution mechanism 35 (e.g., a lever, deflector, guide, or a portion of a conveyor) is disposed upstream of the sheet discharge tray 20 in the conveyance direction of the sheet. The distribution mechanism 35 switches a discharge destination of the sheet between the upper tray 20U and the lower tray 20L.

The wireless tag communication device 50 (e.g., a wireless communication interface or communication interface) includes an arithmetic device, a storage device, and an antenna 51. The wireless tag according to the present embodiment is, for example, a radio frequency identifier (RFID) tag. The wireless tag communication device 50 transmits radio waves in a direction of an arrow k, for example. The wireless tag communication device 50 communicates with the wireless tag T provided on the sheet S via the antenna 51. For example, the wireless tag communication device 50 can wirelessly communicate with the wireless tag T of the sheet S temporarily stopped by the registration rollers 31 on the first conveyance path 33a. Specifically, the wireless tag communication device 50 reads information from the wireless tag T and writes information onto the wireless tag T.

The information to be written on the wireless tag is an identification number of the sheet, and the like. For example, when the sheet is used for distribution or the like, information indicating contents, information indicating a destination, contents to be printed on the sheet, and the like may be written on the wireless tag. In the present embodiment, the wireless tag communication device 50 uses, for example, a 900 MHz band radio wave system (UHF). However, a RFID method and a frequency band are not limited thereto, and other methods and frequency bands may be adopted.

Figure 2:
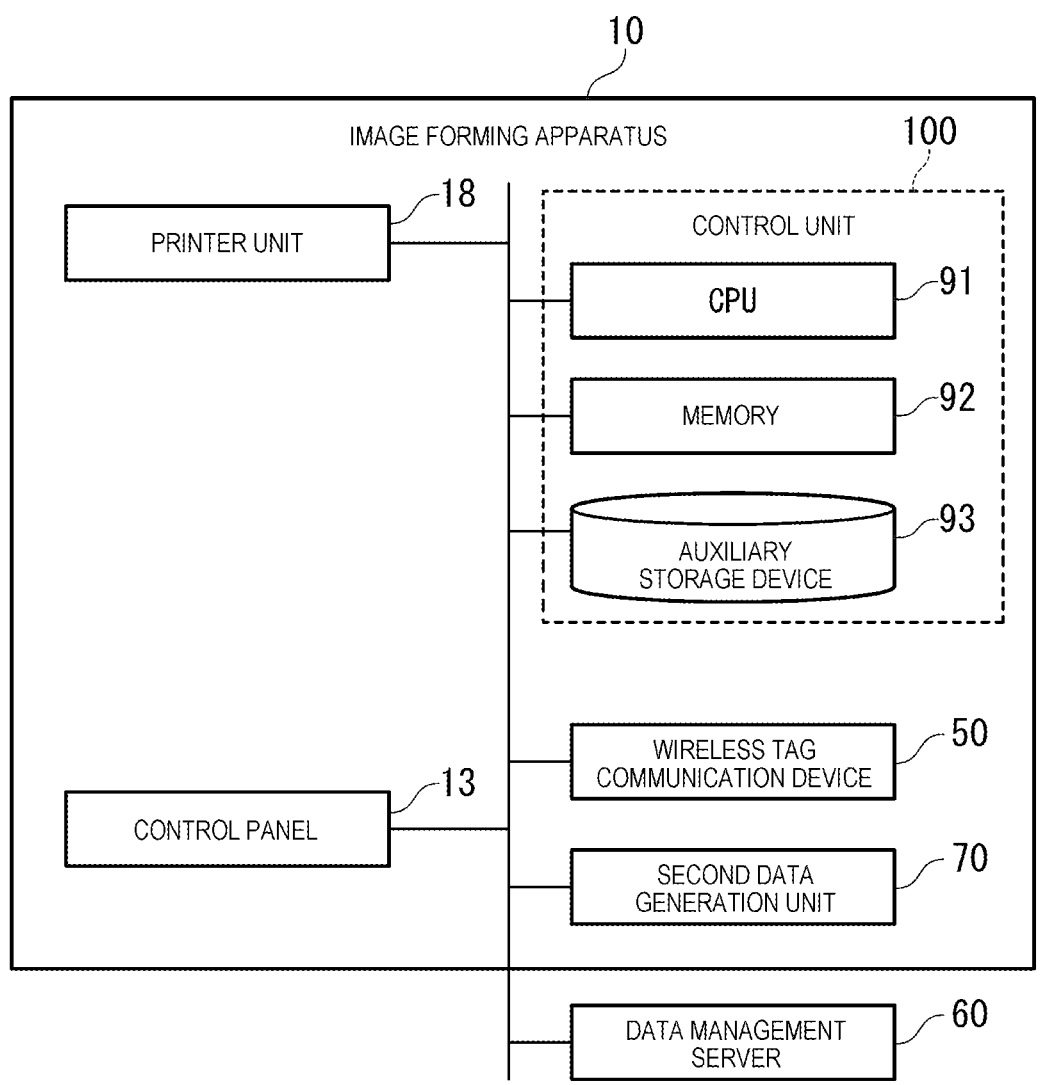
FIG. 2 is a hardware configuration diagram of the image forming apparatus.

The control unit 100 (e.g., a controller) controls each unit of the image forming apparatus 10. FIG. 2 is a hardware configuration diagram of the image processing apparatus. The image forming apparatus 10 includes a central processing unit (CPU) 91, a memory 92, an auxiliary storage device 93, and the like connected by a bus, and executes programs. The image forming apparatus 10 functions as an apparatus including the printer unit 18, the control panel 13, and the wireless tag communication device 50 by executing the programs.

The CPU 91 functions as the control unit 100 by executing the programs stored in the memory 92 and the auxiliary storage device 93. The control unit 100 controls an operation of each functional unit of the image forming apparatus 10. The auxiliary storage device 93 is implemented by a storage device such as a magnetic hard disk device or a semiconductor storage device. The auxiliary storage device 93 stores information. The image forming apparatus 10 is connected to a data management server 60, which is a host system. The data management server 60 stores information on the wireless tag T.

Figure 3:
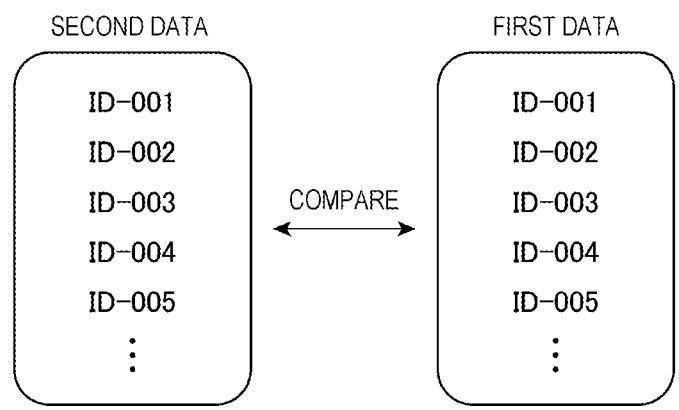
FIG. 3 is an explanatory diagram of first data and second data.

A function of checking an identity of the sheet S (hereinafter may be referred to as ID checking) by the control unit 100 will be described. FIG. 3 is an explanatory diagram of first data (e.g., wireless tag data) and second data (e.g., known identification data, comparison data). On the wireless tag T of the sheet S, an identification number (ID number) of the sheet S is recorded as the first data. In the data management server 60, an identification number (ID number) of the sheet S is recorded as the second data (e.g., in a database).

The control unit 100 reads the first data from the wireless tag T of the sheet S on the first conveyance path 33a by the wireless tag communication device 50 shown in FIG. 1. The control unit 100 acquires the second data from the data management server 60. The control unit 100 compares the first data with the second data. When the first data matches the second data, the control unit 100 determines that the sheet S from which the first data is read is the same as the sheet S recorded in the data management server 60.

The sheet placement portion 16 shown in FIG. 1 is filled with the sheet set SS. The plurality of sheets S in the sheet set SS are continuously conveyed on the first conveyance path 33a. The control unit 100 reads first data from the wireless tags T of the plurality of sheets S.

In the data management server 60, identification numbers of the plurality of sheets S in the sheet set SS are recorded as second data. The control unit 100 acquires the second data from the data management server 60.

The control unit 100 compares the first data with the second data. When the first data matches the second data, the control unit 100 determines that the sheet set SS from which the first data is read is the same as the sheet set SS recorded in the data management server 60.

For example, the user of the image forming apparatus 10 provides a sheet user with the sheet set SS on which images are formed. The sheet user returns the sheet set SS to the user. The user checks identity of the returned sheet set SS and the provided sheet set SS.

The user writes the second data onto the sheet set SS before providing the sheet set SS to the sheet user. The user fills the sheet placement portion 16 shown in FIG. 1 with the sheet set SS. The plurality of sheets S in the sheet set SS are continuously conveyed on the first conveyance path 33a. The control unit 100 acquires the second data in advance from the data management server 60. The control unit 100 writes the second data onto the wireless tags T of the plurality of sheets S. The image forming unit forms images on the plurality of sheets S on which the second data is written. The plurality of sheets S on which the images are formed are discharged to the sheet discharge tray 20. The user provides the sheet set SS on which the images are formed to the sheet user.

The second data written on the sheet set SS is recorded on the sheet set SS as the first data. The user reads the first data from the returned sheet set SS. The user fills the sheet placement portion 16 with the returned sheet set SS. The plurality of sheets S in the sheet set SS are continuously conveyed on the first conveyance path 33a. The control unit 100 reads the first data from the wireless tags T of the plurality of sheets S.

The control unit 100 acquires the second data from the data management server 60. The control unit 100 compares the first data with the second data. When the first data matches the second data, the control unit 100 determines that the returned sheet set SS and the provided sheet set SS are the same.

As shown in FIG. 2, the image forming apparatus 10 may include a second data generation unit 70 (e.g., a second controller) that generates the second data. The second data generation unit 70 records the generated second data in the data management server 60. The control unit 100 acquires the second data generated by the second data generation unit 70 from the data management server 60 and writes the second data onto the wireless tags T of the plurality of sheets S. The second data acquired from the outside may be recorded in the data management server 60. The control unit 100 writes the second data acquired from the outside onto the wireless tags T of the plurality of sheets S.

The control unit 100 may form a specific image on the sheet S for which ID checking succeeds. For example, the specific image is a character indicating that the ID checking is completed. The specific image may be an entirely black (filled) image (e.g., a redacting image). Even when confidential information is included in an image formed on the sheet S in advance, leakage of the confidential information can be prevented by overwriting the image with the entirely black specific image.

Figure 4:
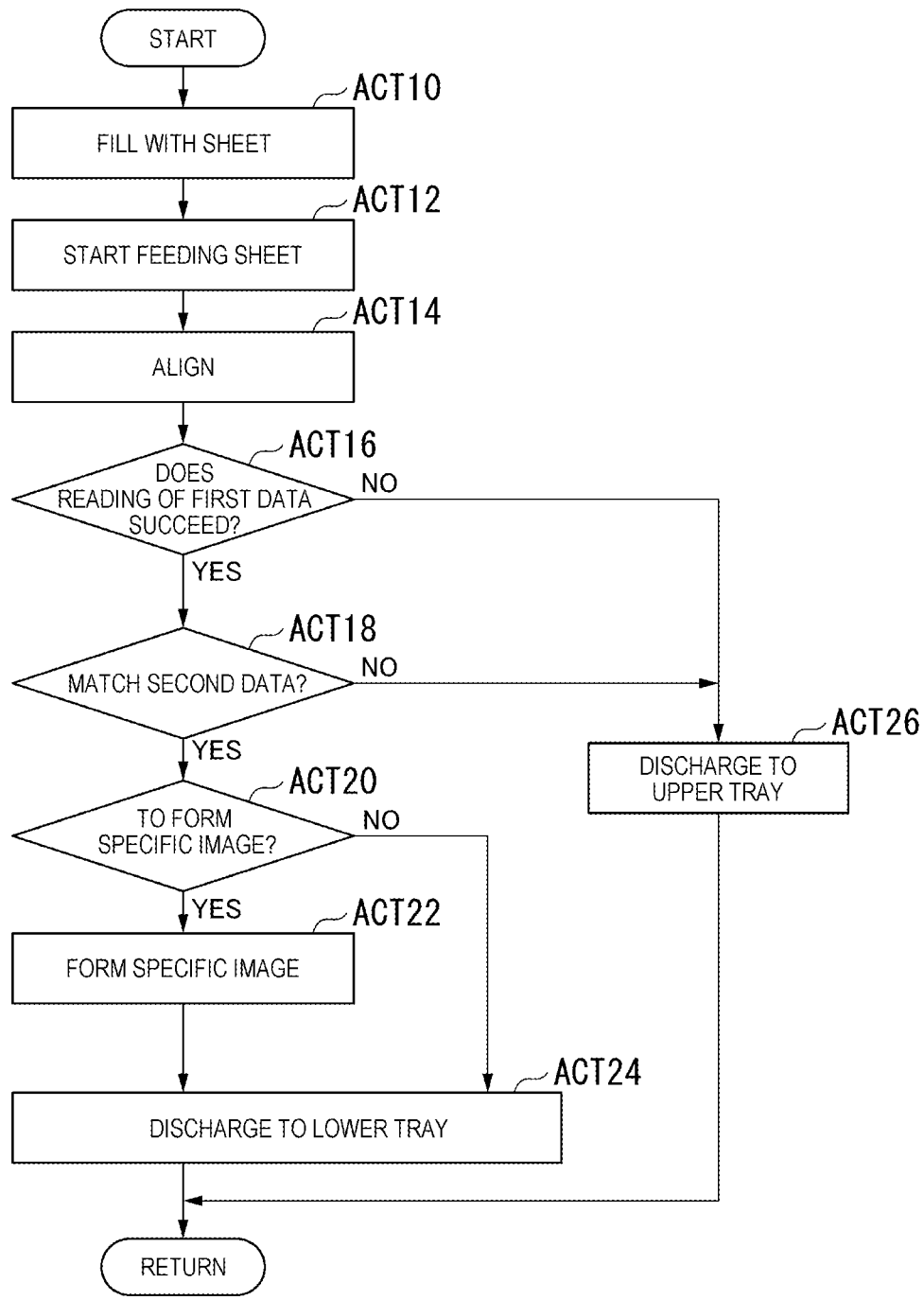
FIG. 4 is a flowchart of an ID checking method.

An ID checking method according to the embodiment will be described. FIG. 4 is a flowchart of the ID checking method. The user of the image forming apparatus 10 fills the sheet placement portion 16 shown in FIG. 1 with the sheet set SS (ACT 10). The user selects an ID checking mode by the control panel 13. The control unit 100 acquires second data from the data management server 60. Second data on a plurality of sheet sets SS is recorded in the data management server 60. The user may use the control panel 13 to select the sheet set SS for ID checking. In this case, the control unit 100 acquires the second data on the selected sheet set SS from the data management server 60.

The user inputs information on a specific image by the control panel 13. The specific image is an image to be formed on the sheet S for which the ID checking succeeds. The information on the specific image includes information on whether it is necessary to form the specific image and information on a type of the specific image.

The image forming apparatus 10 starts feeding the sheet S (ACT 12). The plurality of sheets S in the sheet set SS are fed one by one from the sheet placement portion 16 to the first conveyance path 33a. The registration rollers 31 on the first conveyance path 33a temporarily stop the sheet S and align the sheet S (ACT 14). The wireless tag communication device 50 wirelessly communicates with the wireless tag T of the sheet S temporarily stopped by the registration rollers 31. The control unit 100 reads first data from the wireless tag T via the wireless tag communication device 50.

The control unit 100 determines whether the reading of the first data succeeds (ACT 16). If the reading of the first data succeeds (ACT 16: YES), the control unit 100 compares the first data with the second data. The control unit 100 determines whether the first data matches the second data (ACT 18). When both match (ACT 18: YES), the control unit 100 determines that ID checking succeeds. The control unit 100 determines that the sheet S from which the first data is read is the same as the sheet S recorded in the data management server 60. The control unit 100 displays on the control panel 13 and records in the data management server 60 that the ID checking succeeds.

If the ID checking succeeds (ACT 18: YES), the control unit 100 determines whether it is necessary to form the specific image (ACT 20). The control unit 100 determines whether it is necessary to form the specific image according to the information input by the user. If it is necessary to form the specific image (ACT 20: YES), the control unit 100 forms the specific image on the sheet S (ACT 22). The control unit 100 selects the type of the specific image according to the information input by the user and forms the specific image. By forming the specific image, it is possible to visually confirm that the ID checking for the sheet S succeeds.

The control unit 100 discharges the sheet S on which the specific image is formed to the lower tray 20L shown in FIG. 1 (ACT 24). The control unit 100 selects the lower tray 20L as a discharge destination of the sheet S by the distribution mechanism 35. When it is unnecessary to form the specific image (ACT 20: NO), the control unit 100 does not form the specific image on the sheet S. In this case, the control unit 100 also discharges the sheet S to the lower tray 20L (ACT 24).

If the reading of the first data fails (ACT 16: NO), the control unit 100 discharges the sheet S to the upper tray 20U (ACT 26). The control unit 100 selects the upper tray 20U as a discharge destination of the sheet S by the distribution mechanism 35. If the reading of the first data succeeds (ACT 16: YES) but the first data does not match the second data (ACT 18: NO), the control unit 100 determines that the ID checking fails. In this case, the control unit 100 also discharges the sheet S to the upper tray 20U (ACT 26).

The sheet S for which the ID checking succeeds is discharged to the lower tray 20L. Other sheets S are discharged to the upper tray 20U. The sheet S for which the ID checking succeeds can be separated from the other sheets S.

The processing from ACT 12 to ACT 26 is repeated for the plurality of sheets S in the sheet set SS. When the first data of all the sheets S matches the second data, the control unit 100 determines that the ID checking for all the sheets S succeeds. The control unit 100 determines that the sheet set SS from which the first data is read is the same as the sheet set SS recorded in the data management server 60. The control unit 100 displays on the control panel 13 that the ID checking for all the sheets S succeeds.

Only the first data of some of the sheets S among the first data of the plurality of sheets S may match the second data and the ID checking may succeed. The control unit 100 displays, on the control panel 13, information on the sheet S for which the ID checking succeeds and information on the sheet S for which the ID checking fails.

The control unit 100 may acquire the second data on the plurality of sheet sets SS from the data management server 60. In this case, only the second data on the specific sheet set SS matches the first data, and the ID checking succeeds. The control unit 100 displays, on the control panel 13, information on the specific sheet set SS for which the ID checking succeeds.

As described above in detail, the image forming apparatus 10 according to the embodiment includes the first conveyance path 33a, the wireless tag communication device 50, and the control unit 100. On the first conveyance path 33a, the sheet S is conveyed. The wireless tag communication device 50 can wirelessly communicate with the wireless tag T of the sheet S. The control unit 100 reads first data from the wireless tag T of the sheet S on the first conveyance path 33a by the wireless tag communication device 50. The control unit 100 compares the first data with second data acquired in advance.

The ID checking for the sheet S can be performed by comparing the first data read from the sheet S with the second data acquired in advance. The control unit 100 reads first data from the wireless tag T of the sheet S on the first conveyance path 33a by the wireless tag communication device 50. Since the first data is read, a device other than the wireless tag communication device 50 is unnecessary.

The image forming apparatus 10 further includes the secondary transfer roller 32. The secondary transfer roller 32 is located on the first conveyance path 33a and forms an image on the sheet S. The control unit 100 writes, by the wireless tag communication device 50, the second data onto a plurality of sheets S continuously conveyed on the first conveyance path 33a, and forms images by the secondary transfer roller 32. Thereafter, the control unit 100 reads again the first data from the plurality of sheets S continuously conveyed on the first conveyance path 33a. After the plurality of sheets S are discharged on which the second data is written and the images are formed, the control unit 100 reads again the first data from the plurality of sheets S continuously conveyed on the first conveyance path 33a.

The control unit 100 writes the second data onto the plurality of sheets S continuously conveyed on the first conveyance path 33a. The second data written on the sheet S is recorded on the sheet S as the first data. The control unit 100 reads again the first data from the plurality of sheets S continuously conveyed on the first conveyance path 33a. The control unit 100 compares the read first data with the second data acquired in advance. The ID checking for the sheet set SS from which the first data is read and the sheet set SS on which the second data is written can be performed.

The image forming apparatus 10 further includes the second data generation unit 70 that generates the second data. The control unit 100 writes the second data generated by the second data generation unit 70 onto the plurality of sheets S. The control unit 100 writes the second data acquired from the outside onto the plurality of sheets S. The ID checking can be performed using various types of second data.

According to at least one embodiment described above, the first data is read from the wireless tag T of the sheet S on the first conveyance path 33a and compared with the second data acquired in advance. Accordingly, the ID checking for the sheet S can be performed.

While certain embodiments have been described, these embodiments have been presented by way of examples only, and are not intended to limit the scope of the disclosure. These embodiments can be implemented in various other forms, and various omissions, substitutions, and modifications can be made without departing from the spirit of the disclosure. These embodiments and modifications thereof fall within the scope and spirit of the disclosure and are included in the scope of the invention recited in the claims and the equivalent thereof.

What is claimed is:
1. An image forming apparatus comprising:
  a conveyor configured to convey a sheet along a conveyance path, the conveyor including at least one roller;
  an image forming unit positioned along the conveyance path;

a communication circuit positioned to wirelessly communicate with a wireless tag of the sheet while the sheet is positioned on the conveyance path, the wireless tag containing first data; and a controller configured to:
receive second data from a server outside of the image forming apparatus, the second data including identification data corresponding to a plurality of recorded sheets;
read, by the communication circuit and after receiving the second data, the first data from the wireless tag of the sheet while the sheet is positioned on the conveyance path;
compare the first data with the second data to determine whether the first data matches the identification data for any of the plurality of recorded sheets;
in response to a determination that the first data matches the identification data for one of the plurality of recorded sheets, control the image forming unit to form an image on the sheet and control the conveyor to move the sheet to a first discharge destination; and
in response to a determination that the first data does not match the identification data for any of the plurality of recorded sheets, control the conveyor to move the sheet to a second discharge destination.

2. The image forming apparatus of claim 1, wherein the sheet is a first sheet of a plurality of sheets that are continuously conveyed along the conveyance path, each of the plurality of sheets including a wireless tag,
wherein the controller is configured to:
control the communication circuit to write the second data onto the wireless tags as the plurality of sheets are continuously conveyed on the conveyance path;
control the image forming unit to form images on the plurality of sheets; and
read, by the communication circuit, the first data from the wireless tags of the plurality of sheets continuously conveyed on the conveyance path.

3. The image forming apparatus of claim 2, wherein after the plurality of sheets are discharged on which the second data is written and the images are formed, the controller is configured to read again the first data from the plurality of sheets continuously conveyed on the conveyance path.

4. The image forming apparatus of claim 2, further comprising:
a second controller configured to generate the second data,
wherein the controller is configured to write the second data generated by the second controller onto the plurality of sheets.

5. The image forming apparatus of claim 1, further comprising:
a second controller configured to generate the second data and provide the second data to the server.

6. The image forming apparatus of claim 1, wherein the communication circuit is configured to wirelessly communicate with the wireless tag using radio waves.

7. The image forming apparatus of claim 1, wherein the first data includes an identification number of the sheet.

8. The image forming apparatus of claim 1, wherein the first data includes at least one of (a) contents to be printed on the sheet or (b) a destination for the sheet.

9. The image forming apparatus of claim 1, wherein the communication circuit is configured to write data onto the wireless tag.

10. The image forming apparatus of claim 1, wherein the image is a redacting image configured to obscure an existing image formed on the sheet prior to forming the redacting image.

11. An apparatus comprising:
a conveyor configured to convey a plurality of sheets along a conveyance path to at least one discharge destination, the conveyor including at least one roller and each of the plurality of sheets including a wireless tag;
an image forming unit positioned along the conveyance path;
a communication circuit positioned to wirelessly communicate with the wireless tags as the plurality of sheets are conveyed along the conveyance path; and
a controller configured to:
control the communication circuit to write identification data onto the wireless tags, the identification data identifying the plurality of sheet corresponding to the wireless tag where the identification data is written;
record the identification data into a database of a server outside of the apparatus;
acquire the identification data corresponding to a plurality of recorded sheets from the server;
subsequent to acquiring the identification data from the server and while the conveyor conveys a first sheet of the plurality of sheets along the conveyance path, control the communication circuit to read wireless tag data written onto the wireless tag of the first sheet;
compare the wireless tag data with the identification data acquired from the server to determine whether the first data matches the identification data for any of the plurality of recorded sheets;
in response to a determination that the first data matches the identification data for one of the plurality of recorded sheets, control the image forming unit to form an image on the first sheet and control the conveyor to move the first sheet to a first discharge destination; and
in response to a determination that the first data does not match the identification data for any of the plurality of recorded sheets, control the conveyor to move the first sheet to a second discharge destination.

12. The apparatus of claim 11, wherein the controller is configured to record the identification data into the database by transmitting the identification data to a server that stores the database.

13. A verification method comprising:
retrieving identification data from a server corresponding to a plurality of recorded sheets;
conveying, by a conveyor including at least one roller, a sheet along a conveyance path;
wirelessly reading, by a communication circuit, wireless tag data stored on a wireless tag of the sheet as the sheet moves along the conveyance path and after retrieving the identification data;
comparing the wireless tag data with the identification data retrieved from the server;
in response to a determination that the wireless tag data matches the identification data for one of the plurality of recorded sheets, control an image forming unit to form an image on the sheet and control the conveyor to move the sheet to a first discharge destination; and in response to a determination that the wireless tag data does not match the identification data for any of the plurality of recorded sheets, control the conveyor to move the sheet to a second discharge destination.

14. The image forming apparatus claim 1, wherein the conveyor includes a lever configured to contact the sheet to change a discharge destination of the sheet between the first discharge destination and the second discharge destination.

\* \* \* \* \*